US012017241B2

(12) United States Patent
Friend et al.

(10) Patent No.: US 12,017,241 B2
(45) Date of Patent: Jun. 25, 2024

(54) ACOUSTIC WAVE ATOMIZER

(71) Applicant: The Regents of the University of California, Oakland, CA (US)

(72) Inventors: James Friend, San Diego, CA (US); Victor Nizet, San Diego, CA (US); Monika Kumaraswamy, San Diego, CA (US); Sean Collignon, San Diego, CA (US); Gopesh Tilvawala, San Diego, CA (US); William Connacher, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 360 days.

(21) Appl. No.: 16/632,303

(22) PCT Filed: Jul. 20, 2018

(86) PCT No.: PCT/US2018/043162
§ 371 (c)(1),
(2) Date: Jan. 17, 2020

(87) PCT Pub. No.: WO2019/018809
PCT Pub. Date: Jan. 24, 2019

(65) Prior Publication Data

US 2020/0164398 A1 May 28, 2020

Related U.S. Application Data

(60) Provisional application No. 62/535,686, filed on Jul. 21, 2017.

(51) Int. Cl.

| | |
|---|---|
| ***B05B 17/06*** | (2006.01) |
| ***B06B 1/02*** | (2006.01) |
| ***B06B 1/06*** | (2006.01) |

(52) U.S. Cl.
CPC ...... *B05B 17/0615* (2013.01); *B05B 17/0661* (2013.01); *B06B 1/0269* (2013.01); *B06B 1/0644* (2013.01); *B06B 2201/77* (2013.01)

(58) Field of Classification Search
CPC ............ B05B 17/0646; B05B 17/0607; B05B 17/063; B05B 17/0615; B05B 17/0661;
(Continued)

(56) References Cited

U.S. PATENT DOCUMENTS

2011/0192914 A1 8/2011 Ishigami
2014/0358830 A1 12/2014 Chiang et al.
(Continued)

FOREIGN PATENT DOCUMENTS

DE 202007006399 * 5/2007 ............ B05B 17/06
DE 202007006399 U1 8/2007
(Continued)

OTHER PUBLICATIONS

95/EC of the European Parliament and of the Council of Jan. 27, 2003 on the restriction of the use of certain hazardous substances in electrical and electronic equipment. Directive, EU, 2002.
(Continued)

*Primary Examiner* — Christopher R Dandridge
(74) *Attorney, Agent, or Firm* — Mintz Levin Cohn Ferris Glovsky and Popeo, P.C.

(57) ABSTRACT

Articles of manufacture, including an apparatus for acoustic wave based atomization, are provided. The apparatus may include a monocrystalline piezoelectric substrate. The monocrystalline piezoelectric substrate may include a surface patterned with at least one wetting region. The monocrystalline piezoelectric substrate may be configured to respond to an electric signal by at least generating acoustic waves including, for example, surface acoustic waves, Bluestein-Gulayev waves, Lamb waves, Love waves, flex-
(Continued)

ural waves, thickness mode vibrations, mixed-mode waves, longitudinal waves, shear mode vibrations, and/or bulk wave vibrations. The acoustic waves may atomizing at least a portion of a material collected within the at least one wetting region to form a mist of the material. Methods for acoustic wave based atomization are also provided.

19 Claims, 7 Drawing Sheets

(58) Field of Classification Search
CPC .. B06B 2201/77; B06B 1/0269; B06B 1/0644
See application file for complete search history.

(56) References Cited

U.S. PATENT DOCUMENTS

| | | | | |
|---|---|---|---|---|
| 2014/0364966 | A1 | 12/2014 | Matsuoka et al. | |
| 2015/0193695 | A1 | 7/2015 | Cruz Mota et al. | |
| 2015/0227838 | A1 | 8/2015 | Wang et al. | |
| 2015/0242741 | A1 | 8/2015 | Campos et al. | |
| 2015/0254575 | A1 | 9/2015 | Nere et al. | |
| 2016/0078361 | A1 | 3/2016 | Brueckner et al. | |
| 2017/0178884 | A1* | 6/2017 | Murtazin | G01J 3/443 |

FOREIGN PATENT DOCUMENTS

| | | | | |
|---|---|---|---|---|
| EP | 3017876 | * | 5/2016 | B05B 17/0607 |
| EP | 3017876 A1 | | 5/2016 | |
| WO | WO2011061480 | * | 5/2011 | B05B 17/0661 |
| WO | WO-2016075209 A1 | | 5/2016 | |
| WO | WO2016179664 | * | 11/2016 | B06B 1/06 |
| WO | WO-2016179664 A1 | * | 11/2016 | B05B 17/0615 |

OTHER PUBLICATIONS

Andersen, B. et al., "Performance of Piezoelectric Ceramic Multilayer Components Based on Hard and Soft PZT," Proceedings of Actuator 2000 2000, 419-422.
Antibiotic Resistance Threats in the United States: Centers for Disease Control and Prevention, 2013.
Awad, S. "Ultrasonic cavitations and precision cleaning," Precision Cleaning 1996, 4, 12.
Baek, S. H et al. "Giant Piezoelectricity on Si for Hyperactive MEMS," Science 2011, 334, 958-961.
Berndt, H. "High pressure nebulization: a new way of sample introduction for atomic spectroscopy," Fresenius' Zeitschrift für analytische Chemie 1988, 331, 321-323.
Blamey, J. et al., "Microscale Capillary Wave turbulence Excited by High Frequency Vibration." Langmuir, 2013, 29, 3835-3845.
Boucher, R. et al., "The fundamentals of the ultrasonic atomization of medicated solutions," Annals of Allergy 1968, 26, 591.
Boyce, J.M., "Modern technologies for improving cleaning and disinfection of environmental surfaces in hospitals," Antimicrob Resist Infect Control 2016; 5:10.
Bretos, I. et al., "Photochemical Solution Deposition of Lead-Based Ferroelectric Films: Avoiding the PbO-Excess Addition at Last," Chemistry of Materials 2008, 20, 5731-5733.
Brunet, P. et al., "Droplet displacements and oscillations induced by ultrasonic surface acoustic waves: A quantitative study," Physical Review E 2010, 81, 036315.
Carling, P.C. et al., "Improved cleaning of patient rooms using a new targeting method," Clin Infect Dis 2006; 42:385-8.
Collignon, S. et al., "Planar Microfluidic drop Splitting and Merging," Lab on a Chip 2015, 15, 1942-1951.
Collins, D. J. et al., "Atomization off thin water films generated by high-frequency substrate wave vibrations," Physical Review E 2012, 86, 056312.
Dancer, S.J. et al., "Measuring the effect of enhanced cleaning in a UK hospital: a prospective cross-over study," BMC Med 2009; 7:28.
Destgeer, G. et al., "Continuous separation of particles in a PDMS microfluidic channel via travelling surface acoustic waves (TSAW)," Lab on a Chip 2013, 13, 4210-4216.
Ding, X. et al., "On-chip manipulation of since microparticles, cells, and organisms using surface acoustic waves," J. Proceedings of the National Academy of Sciences 2012, 109, 11105-11109.
Drees, M. et al., "Prior environmental contamination increases the risk of acquisition of vancomycin-resistant enterococci," Clin Infect Dis 2008; 46:678-85.
Eckstein, B.C. et al., "Reduction of Clostridium Difficile and vancomycin-resistant Enterococcus contamination of environmental surfaces after an intervention to improve cleaning methods," BMC Infect Dis 2007; 7:61.
Finlay, W. H. et al., "Lung Delivery of Aerosolized Dextran," American Journal of Respiratory and Critical Care Medicine 2000, 161, 91-97.
Ghazanfari, T. et al., "The influence of fluid physicochemical properties on vibrating-mesh nebulization," International Journal of Pharmaceutics 2007, 339, 103-111.
Hayden, M.K. et al., "Reduction in acquisition of vancomycin-resistant enterococcus after enforcement of routine environmental cleaning measures," Clin Infect Dis 2006; 42:1552-60.
Health Do. Winning ways: working together to reduce healthcare associated infection in England. In: Report from the Chief Medical Officer L, ed, 2003.
Huang, S.S. et al., "Risk of acquiring antibiotic-resistant bacteria from prior room occupants," Arch Intern Med 2006; 166:1945-51.
Jeng, Y.-R. et al., "A PZT-driven atomizer based on a vibrating flexible membrane and a micro-machined trumpet-shaped nozzle array," Microsystem Technologies 2009, 15, 865-873.
Jin, Y. et al., "Lamb wave propagation in 128° Y-X lithium niobate plates," Ultrasonics Symposium, 1993. Proceedings IEEE 1993. 1993; pp. 847-851.
Kauppila, T. J. et al., Atmospheric Pressure Photoionization-Mass Spectrometry with a Microchip Heated Nebulizer, Analytical Chemistry 2004, 76, 6797-6801.
Kawamata, A. et al., Non-hysteresis and perfect linear piezoelectric performance of a multilayered lithium niobate actuator, Sensors and Actuators A: Physical 2007, 135, 782-786.
Kim, S.-G et al., "Piezoelectric MEMS for energy harvesting," MRS Bulletin 2012, 37, 1039-1050.
Kramer, A. et al., "How long do nosocomial pathogens persist on inanimate surfaces? A systematic review," BMC Infect Dis 2006; 6:130.
Kumar, K. "Linear theory of Faraday instability in viscous liquids," Proceedings of the Royal Society of London A: Mathematical, Physical and Engineering Sciences 1996, 452, 1113-1126.
Le Brun, P. et al., A review of the technical aspects of drug nebulization, Pharmacy World and Science 2000, 22, 75-81.
Lester W., Jr. et al., "Bactericidal Effects of Propylene and Triethylene Glycol Vapors on Airborne *Escherichia coli*." Science 1952; 115:379-82.
Lester W. Jr. et al., "The Rate of Bactericidal Action of Triethylene Glycol Vapor on Microorganisms Dispersed Into the Air in Small Droplets," American Journal of Hygiene 1949, 50, 175-88.
Magill, S.S. et al., "Multistate point-prevalence survey of health care-associated infections," N Engl J Med 2014; 370(13):1198-208.
Masoodi, R. et al., Darcy's Law-Based Model for Wicking in Paper-Like Swelling Porous Media, AIChE Journal 2010, 56, 2257-2267.
Mccallion, O. et al., "Jet nebulisers for pulmonary drug delivery," International Journal of Pharmaceutics 1996, 130, 1-11.
Mellody M. et al., "The fungicidal action of triethylene glycol," J Infect Dis 1946; 79:45-56.
Morita, T. et al., "An ultrasonic micromotor using a bending cylindrical transducer based on PZT thin film," Sensors and Actuators A: Physical 1995, 50, 75-80.
Morrow, P. E. "Experimental Studies of Inhaled Materials: A Basic for Respiratory Models," Archives of Internal Medicine 1970, 126, 466-470.

(56) References Cited

OTHER PUBLICATIONS

Muto, C.A. et al., "SHEA guideline for preventing nosocomial transmission of multidrug-resistant strains of *Staphylococcus aureus* and *Enterococcus*," Infect Control Hosp Epidemiol 2003; 24:362-86.
Newell, A. C. et al., "Wave turbulence," Annual Review of Fluid Mechanics 2011, 43, 59-78.
Oroian, M. "Measurement, prediction and correlation of density, viscosity, surface tension and ultrasonic velocity of different honey types at different temperatures," Journal of Food Engineering 2013, 119, 167-172.
Pekarcikova, M. et al., "Investigation of high power effects on Ti/Al and Ta—Si—N/Cu/Ta—Si—N electrodes for SAW devices," Ultrasonics, Ferroelectrics, and Frequency Control, IEEE Transactions on 2005, 52, 911-917.
Performance Standards for Antimicrobial Susceptibility Testing; Twenty-Second Informational Supplement. Clinical and Laboratory Standards Institute. vol. 32, 2012:M100-S22.
Qi, A. et al., "Interfacial destabilization and atomization driven by surface acoustic waves," Physics of Fluids (1994-present) 2008, 20, 074103.
Qi, A. et al., "Miniature inhalation therapy platform using surface acoustic wave microfluidic atomization," Lab on a Chip 2009, 9, 2184-2193.
Rajapaksa, A. E. et al., "Effective pulmonary delivery of an aerosolized plasmid DNA vaccine via surface acoustic wave nebulization," E. Respiratory Research 2014, 15, 60.
Randall, C. A. et al., "Intrinsic and Extrinsic Size Effects in Fine-Grained Morphotropic-Phase-Boundary Lead Ziconate Titanate Ceramics," Journal of the American Ceramic Society 1998, 81, 677-688.
Reddy, G. B. Technical report. Environmental Protection Agency 1993.
Rezk, A. R. et al., "Microfluidics: HYbriD Resonant Acoustics (HYDRA)," Advanced Materials 2016.
Rezk, A. R. et al., "Simple, low cost MHz-order acoustomicrofluidics using aluminium foil electrodes," Lab on a Chip 2014, 14, 1802-1805.
Robertson, O. H. et al., "Disinfection of the air with triethylene glycol vapor," Am J Med 1949; 7:293-6.
Robertson, O. H. et al., "The Lethal Effect of Triethylene Glycol Vapor on Air-Borne Bacteria and Influenza Virus," American Association for the Advancement of Science, Science, 1943, vol. 97, 142-4.
Rosebury, T. et al., "Disinfection of Clouds of Meningopneumonitis and Psittacosis Viruses with Triethylene Glycol Vapor," J Exp Med 1947; 85:65-76.
Rutala, W.A. et al., "Committee HICA. Guideline for Disinfection and Sterilization in Healthcare Facilities," 2008: Centers for Disease Control, 2008.
Rutala, W.A. et al., "Current principles and practices; new research; and new technologies in disinfection, sterilization, and antisepsis," Am J Infect Control 2013; 41:S1.
Saito, Y. et al., "Lead-free piezoceramics," Nature 2004, 432, 84-87.
Sessler, G. et al., Figure of merit of piezoelectret transducers for pulse-echo or transmit-receive systems for airborne ultrasound, J. Applied Physics Letters 2013, 103, 122904.
Shi, J., et al., Focusing microparticles in a microfluidic channel with standing surface acoustic waves (SSAW), Lab on a Chip 2008, 8, 221-223.
Shibayama, K. et al., Optimum cut for rotated Y-cut LiNbO3crystal used as the substrate of acoustic-surface-wave filters, Proceedings of the IEEE 1976, 64, 595-597.
Shrout, T. R. et al., "Lead-free piezoelectric ceramics: Alternatives for PZT?" Journal of Electroceramics 2007, 19, 113-126.
Silva, E. C. N. et al., "Design of piezoelectric transducers using topology optimization," Smart Materials and Structures 1999, 8, 350.
Snitkin, E.S. et al., "Tracking a hospital outbreak of carbapenem-resistant Klebsiella pneumoniae with whole-genome sequencing," Sci Transl Med 2012; 4:148ra16.
Terhune C., Superbug linked to 2 deaths at UCLA hospital; 179 potentially exposed. Los Angeles Times 2015.
Tsai, S. C. et al., "Ejection of Uniform Micrometer-Sized Droplets from Faraday Waves on a Millimeter-sized Water Drop," Phys. Rev. Lett. 2012, 108, 154501.
Uchino, K. et al., "Loss mechanisms and high power piezoelectics," Frontiers of Ferroelectricity; Springer, 2007; pp. 217-228.
Warner, A. et al., "Determination of Elastic and Piezoelectric Constants for Crystals in Class (3m)," The Journal of the Acoustical Society of America 1967, 42, 1223-1231.
Watson, B. et al., "Piezoelectric ultrasonic micro/milli-scale actuators," Sensors and Actuators A: Physical 2009, 152, 219-233.
White, R. et al., Direct Piezoelectric Coupling to Surface Elastic Waves, Applied Physics Letters 1965, 7,314-316.
Wixforth, A. et al., "Acoustic manipulation of small droplets," Analytical and Bioanalytical Chemistry 2004, 379, 982-991.
Zhang, S. et al., "Piezoelectric materials for high power, high temperature applications," Materials Letters 2005, 59, 3471-3475.
Zimlichman, E. et al., "Health care-associated infections: a meta-analysis of costs and financial impact on the US health care system," JAMA Intern Med 2013; 173:2039-46.
Lamb, H. Hydrodynamics; Cambridge University Press, 1932.
Que, Jialan, et al., "A collaborative framework for distributed privacy-preserving support vector machine learning," *AMIA Annual Symposium Proceedings*. American Medical Informatics Association, 2012, pp. 1350-1359, 2012.

* cited by examiner

ACOUSTIC WAVE ATOMIZER

RELATED APPLICATION

This application is a national phase entry of Patent Cooperation Treaty Application No. PCT/US2018/043162 filed Jul. 20, 2018, entitled "ACOUSTIC WAVE ATOMIZER," which claims priority to U.S. Provisional Patent Application No. 62/535,686 filed on Jul. 21, 2017 and entitled "NEBULIZER INCLUDING VIBRATION MECHANISM," the disclosures of which are incorporated herein by reference in their entirety.

TECHNICAL FIELD

The subject matter described herein relates generally to atomizers and more specifically to an atomizer that atomizes materials using acoustic waves.

BACKGROUND

An atomizer may refer to a device for delivering and/or distributing a material by atomizing the material into small aerosol droplets. For example, an atomizer may deliver and/or distribute a fluent material such as, for example, a liquid, a mixture, a solution, a colloid, a suspension, and/or the like. Alternatively and/or additionally, solid materials may also be delivered and/or distributed using an atomizer.

SUMMARY

Articles of manufacture, including apparatuses, and methods for an acoustic wave atomizer are provided. An apparatus for acoustic wave based atomization may include a monocrystalline piezoelectric substrate having a surface patterned with at least one wetting region. The monocrystalline piezoelectric substrate may be configured to respond to an electric signal by at least generating a first plurality of acoustic waves. The first plurality of acoustic waves may atomize at least a portion of a material collected within the at least one wetting region.

In some variations, one or more features disclosed herein including the following features can optionally be included in any feasible combination. The first plurality of acoustic waves may be associated with a first frequency. The monocrystalline piezoelectric substrate may be further configured to respond to the electric signal by at least generating a second plurality of acoustic waves associated with a second frequency. The first plurality of acoustic waves comprise and/or the second plurality of acoustic waves may include surface acoustic waves, Bluestein-Gulayev waves, Lamb waves, Love waves, flexural waves, thickness mode vibrations, mixed-mode waves, longitudinal waves, shear mode vibrations, and/or bulk wave vibrations.

In some variations, the monocrystalline piezoelectric substrate may generate the first plurality of acoustic waves associated with the first frequency at a same time as the second plurality of acoustic waves associated with the second frequency.

In some variations, the monocrystalline piezoelectric substrate may generate the first plurality of acoustic waves associated with the first frequency at a different time as the second plurality of acoustic waves associated with the second frequency.

In some variations, a first region of the monocrystalline piezoelectric substrate may generates the first plurality of acoustic waves associated with the first frequency and a second region of the monocrystalline piezoelectric substrate may generate the second plurality of acoustic waves associated with the second frequency.

In some variations, the generation of the first plurality of acoustic waves associated with the first frequency and the second plurality of acoustic waves associated with the second frequency may control and/or vary a droplet size and/or a droplet size distribution of the atomized material.

In some variations, the monocrystalline piezoelectric substrate may generate the first plurality of acoustic waves associated with the first frequency when the monocrystalline piezoelectric substrate is associated with a first resonant frequency. The monocrystalline piezoelectric substrate may generate the second plurality of acoustic waves associated with the second frequency when the monocrystalline piezoelectric material is associated with a second resonant frequency. The first resonant frequency and/or the second resonant frequency may correspond to a geometry of the monocrystalline piezoelectric substrate and/or a material forming the monocrystalline piezoelectric substrate.

In some variations, the apparatus may further include one or more electrodes configured to couple the monocrystalline piezoelectric substrate to a power supply. The one or more electrodes may include a planar electrode that is patterned over to reveal a portion of the surface of the monocrystalline piezoelectric substrate in order to encourage a deposit of a thin film of the material at a location of atomization.

In some variations, the one or more electrodes may include a combination of different types of electrodes such that the first plurality of acoustic waves includes a combination of different types of acoustic waves. The combination of different types of electrodes may include a planar electrode and/or interdigital electrodes.

In some variations, the monocrystalline piezoelectric substrate may be coupled to the one or more electrodes via one or more contacts. The one or more contacts may include one or more pins.

In some variations, a power input associated with the power supply may be determined based at least on a viscosity of the material.

In some variations, the apparatus may further include a transfer medium coupling the surface of the monocrystalline piezoelectric substrate to a reservoir including the material. The material may be transferred, via the transfer medium, from the reservoir to the surface of the monocrystalline piezoelectric substrate. The transfer medium may be a wick. A point of contact between the transfer medium and the monocrystalline piezoelectric substrate may be positioned towards an edge of the monocrystalline piezoelectric substrate in order to prevent at least a portion of the first plurality of acoustic waves from being absorbed by the transfer medium and/or the reservoir. A tip and/or a stiffness of the transfer medium may be configured to prevent at least a portion of the first plurality of acoustic waves from being absorbed by the transfer medium and/or the reservoir.

In some variations, a hydrophilic material, a hydrophobic material, a superhydrophilic material, a superhydrophobic material, an oleophilic material, and/or an oleophobic material may be deposited on the surface of the monocrystalline piezoelectric substrate. The hydrophilic material, the hydrophobic material, the superhydrophilic material, the superhydrophobic material, the oleophilic material, and/or the oleophobic material may be patterned to encourage a deposit of a thin film of the material at a location of atomization.

In some variations, the monocrystalline piezoelectric material may include lithium niobate ($LiNbO_3$), quartz ($SiO_2$), lithium tantalate ($LiTaO_3$), and/or langasite ($La_3Ga_5SiO_{14}$).

In some variations, the material collected within the at least one wetting region may form a meniscus. The first plurality of acoustic waves may atomize at least the portion of the material by at least destabilizing the meniscus to form capillary waves. The capillary waves may break up to form a plurality of aerosol droplets of the material. A mist of the material may be formed by the plurality of aerosol droplets of the material being ejected from the meniscus.

In some variations, the apparatus may be configured to determine, based at least on a feedback associated with the first plurality of acoustic waves, a status of the meniscus. The apparatus may be configured to cease operation when the status of the meniscus indicates that the meniscus is nonexistent, the meniscus is placed incorrectly, the meniscus is sized incorrectly, and/or the wetting region is contaminated. The feedback may correspond to a reflection and/or a transmission of the first plurality of acoustic waves.

In some variations, the at least one wetting region may be a channel and/or a well. A cross section of the at least one wetting region may be semicircular, rectangular, and/or triangular in shape.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a rechargeable battery, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, and/or elements.

DETAILED DESCRIPTION

Figure 1:
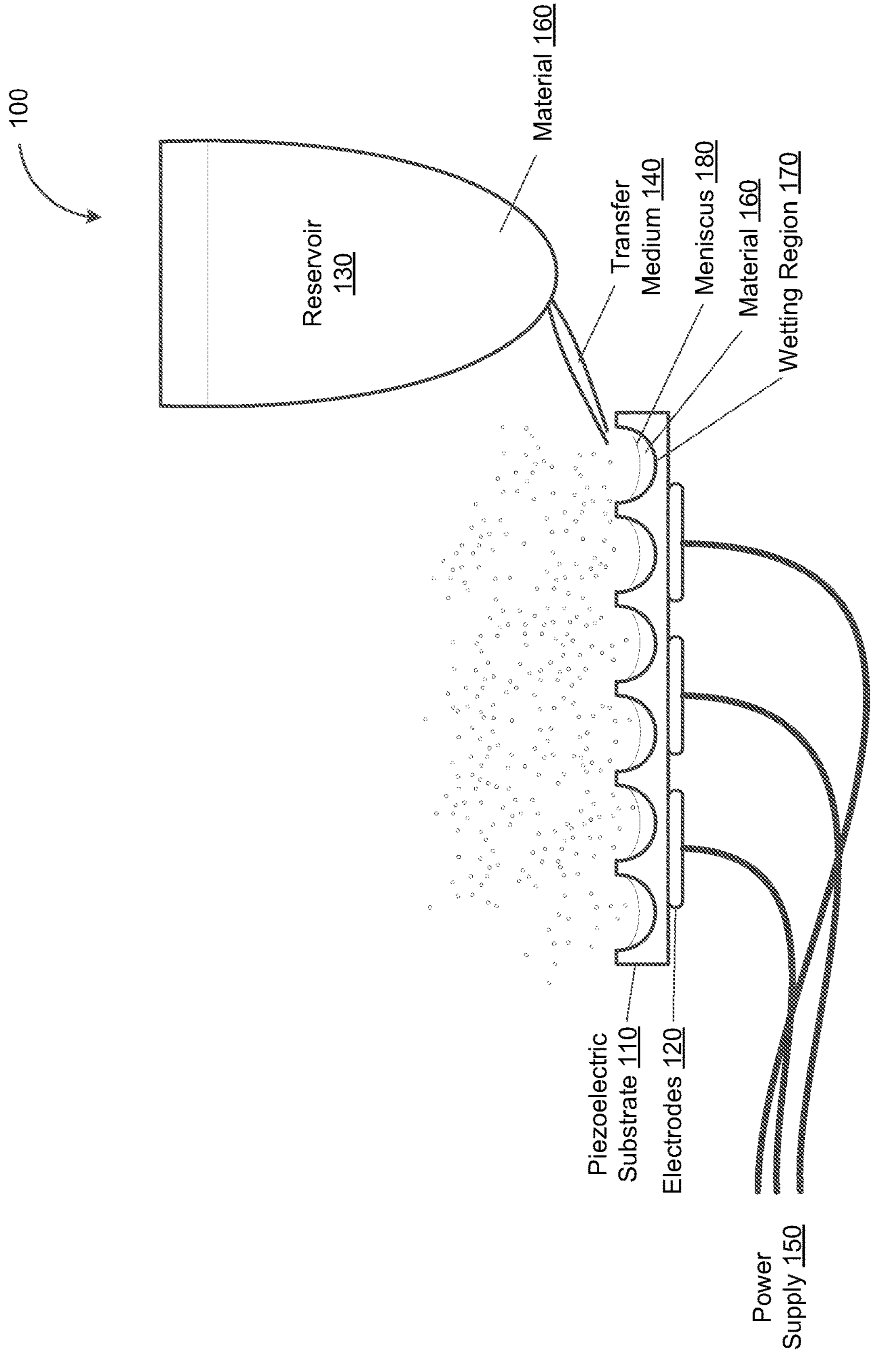
FIG. 1 depicts a side view of an acoustic wave atomizer, in accordance with some example embodiments.

By breaking a material (e.g., a fluent material, a solid material, and/or the like) into small aerosol droplets, an atomizer may create a fine mist of the material. This transformation of the material from a liquid and/or a solid into a fine mist may be necessary for the delivery and/or distribution the material. For example, an atomizer may be used to administer a liquid medication by transforming the liquid medication into an inhalable mist. However, conventional atomizers may have limited applications due to a number of shortcomings. For instance, mechanical atomizers may only be capable of producing fixed sized droplets. As such, a mechanical atomizer cannot be adapted to suit a variety of different applications. Meanwhile, jet collision atomizers, which rely on compressed air jets to atomize a material, may be too noisy and heavy for portable applications and may generate too wide a distribution of droplet sizes for some applications. Accordingly, in some example embodiments, an acoustic wave atomizer may be configured to atomize a material using acoustic waves. By being portable, energy efficient, and capable of producing a large range of droplet sizes in a narrow distribution, the acoustic wave atomizers may be suitable for any application.

In some example embodiments, the acoustic wave atomizer may include a substrate formed from a monocrystalline piezoelectric material including, for example, lithium niobate ($LiNbO_3$), quartz ($SiO_2$), lithium tantalate ($LiTaO_3$), langasite ($La_3Ga_5SiO_{14}$), and/or the like. Furthermore, the monocrystalline piezoelectric substrate may be coupled with one or more electrodes for transmitting an electric signal to the monocrystalline piezoelectric substrate. The monocrystalline piezoelectric substrate may convert electric energy from the electric signal into mechanical energy in the form of acoustic waves. The acoustic waves may atomize a material (e.g., a fluent material, a solid material, and/or the like) that is deposited on a surface of the monocrystalline piezoelectric substrate and/or upon thin films that have been disposed on the surface of the monocrystalline piezoelectric substrate. For example, the material may be deposited on the surface of the monocrystalline piezoelectric substrate via a transfer medium coupling the surface of the monocrystalline piezoelectric substrate to a reservoir holding the material. Once deposited on the surface of the monocrystalline piezoelectric substrate, the material may collect at least partially within one or more wetting regions patterned on the surface of the monocrystalline piezoelectric substrate. The acoustic waves may atomize the material by at least destabilizing the meniscus that is formed by the material collected in the wetting regions on the surface of the monocrystalline piezoelectric substrate.

In some example embodiments, the monocrystalline piezoelectric substrate may be configured to vibrate at multiple frequencies, thereby producing a mixture of different types of acoustic waves including, for example, surface acoustic waves, Bluestein-Gulayev waves, Lamb waves, Love waves, flexural waves, thickness mode vibrations, mixed-mode waves, longitudinal waves, shear mode vibrations, bulk wave vibrations, and/or the like. For instance, the monocrystalline piezoelectric substrate may vibrate at two or more different frequencies simultaneously and/or with spatiotemporal separation. By vibrating at multiple frequencies, the acoustic wave atomizer may prevent the production of certain droplet sizes, which may be unsuitable for a particular application. Alternatively and/or additionally, the acoustic wave atomizer may vibrate at multiple frequencies in order to change the size and/or the size distribution of the aerosol droplets produced by the acoustic wave atomizer.

In some example embodiments, the acoustic wave atomizer may include different combinations of types of electrodes including, for example, planar electrodes, interdigital electrodes, and/or the like. Variations in the types of electrodes coupled with the monocrystalline piezoelectric substrate may alter the types of acoustic waves generated by the monocrystalline piezoelectric substrate. For example, by coupling the monocrystalline piezoelectric substrate with one or more different types of electrodes, the monocrystalline piezoelectric substrate may produce one or more different types of acoustic waves including, for example, surface acoustic waves, Bluestein-Gulayev waves, Lamb waves, Love waves, flexural waves, thickness mode vibrations, mixed-mode waves, longitudinal waves, shear mode vibrations, bulk wave vibrations, and/or the like. As noted, a meniscus may be formed on the surface of the monocrystalline piezoelectric substrate, when material is deposited on the surface of the monocrystalline piezoelectric substrate via a transfer medium that couples the surface of the monocrystalline piezoelectric substrate to a reservoir holding the material. A combination of different types of acoustic waves may facilitate the formation of the meniscus, such that the meniscus may be suitable for atomization by the acoustic wave atomizers. Alternatively and/or additionally, the combination of different types of acoustic waves may provide feedback on a status of the meniscus.

FIG. 1 depicts a side view of an acoustic wave atomizer 100, in accordance with some example embodiments. Referring to FIG. 1, the acoustic wave atomizer 100 may include a piezoelectric substrate 110, which may be coupled to a power supply 150 via one or more electrodes 120. In some example embodiments, the piezoelectric substrate 110 may be formed from a monocrystalline piezoelectric material including, for example, lithium niobate ($LiNbO_3$), quartz ($SiO_2$), lithium tantalate ($LiTaO_3$), langasite ($La_3Ga_5SiO_{14}$), and/or the like.

As shown in FIG. 1, the piezoelectric substrate 110 may be further be coupled, via a transfer medium 140, with a reservoir 130 containing a material 160. In some example embodiments, the transfer medium 140 may be configured to deposit the material 160 onto a surface of the piezoelectric substrate 110 and/or upon thin films (not shown) disposed on the surface of the piezoelectric substrate 110. For example, a hydrophilic material may be disposed on the surface of the piezoelectric substrate 110 while the material 160 may be a fluent material such as, for example, a liquid, a mixture, a solution, a colloid, a suspension, and/or the like. However, it should be appreciated that instead of and/or in addition to the hydrophilic material, a hydrophobic material, a superhydrophobic material, a superhydrophilic material, an oleophobic material, and/or an oleophilic material may be deposited on the piezoelectric substrate 110. Disposing a thin film of the hydrophilic material, the hydrophobic material, the superhydrophobic material, the superhydrophilic material, the oleophobic material, and/or the oleophilic material on at least a portion of the surface of the piezoelectric substrate 110 may render that portion hydrophilic, hydrophobic, superhydrophilic, superhydrophobic, oleophilic, and/or oleophobic. Furthermore, the hydrophilic material, the hydrophobic material, the superhydrophobic material, the superhydrophilic material, the oleophobic material, and/or the oleophilic material may be patterned in a way to encourage a deposit of a desired quantity of the material 160 at a location of atomization.

In some example embodiments, the transfer medium 140 may be a wick that is configured to deposit the fluent material 160 onto the surface of the piezoelectric substrate 110. The wick may be formed from a network of fibrous polymer strands contained within a plastic sheath or a glass capillary tube, such that the wick is exposed only where the wick is in contact the piezoelectric substrate 110 and/or where the wick interfaces with the material 160 contained in the reservoir 130.

According to some example embodiments, a tapered tip at the contact point between the piezoelectric substrate 110 and the transfer medium 140 as well as the stiffness of the transfer medium may prevent the acoustic waves generated by the piezoelectric substrate 110 from being absorbed by the transfer medium 140 and/or the reservoir 130. To further reduce the absorption of the acoustic waves, the point of contact between the transfer medium 140 and the piezoelectric substrate 110 may be positioned towards an edge of the piezoelectric substrate, along a surface that is parallel to the direction of propagation of the acoustic waves. Reducing and/or preventing the absorption of acoustic waves by the transfer medium 140 and/or the reservoir 130 may maximize the acoustic energy available for atomizing the material 160.

In some example embodiments, the surface of the piezoelectric substrate 110 may be patterned with one or more wetting regions such as, for example, a wetting region 170. The one or more wetting regions may be channels, wells, and/or the like. Furthermore, while FIG. 1 shows the one or more wetting regions a having a semicircular cross section, it should be appreciated that the surface of the piezoelectric substrate 110 may be patterned with other shape wetting regions including, for example, rectangular, triangular, and/or the like.

According to some example embodiments, the piezoelectric substrate 110 may be formed from a crystal lithium niobate ($LiNbO_3$) wafer. Prior to patterning the crystal lithium niobate ($LiNbO_3$) wafer, the crystal lithium niobate ($LiNbO_3$) wafer may first be cleaned, for example, using isopropyl alcohol, acetone, and deionized water in succession and in a class 10,000 clean room before being dried under dry nitrogen (N) gas flow. Standard ultraviolet (UV) photolithography may subsequently be used to pattern the wetting regions on the crystal lithium niobate ($LiNbO_3$) wafer. A positive-tone photoresist may be used with a standard mask for defining, via ultraviolet (UV) light, a pattern on one side of the crystal lithium niobate ($LiNbO_3$) wafer. For instance, the pattern may include wetting regions having a semicircular cross section (e.g., the wetting region 170 and/or the like) as well as a 1-millimeter gap along each dicing line later used to cut individual piezoelectric substrates (e.g., the piezoelectric substrate 110 and/or the like) from the crystal lithium niobate ($LiNbO_3$) wafer. After development, the photoresist may remain in the regions to prevent metal deposition in those regions. Plasma vapor deposition may be used to coat both sides of the crystal lithium niobate ($LiNbO_3$) wafer, one side at a time, with 5-10 nanometers of titanium (Ti) and/or chromium (Ch) followed by 1-2 microns (μm) of aluminum (Al) and/or gold (Au). The coated crystal lithium niobate ($LiNbO_3$) wafer may be immersed in an ultrasonic bath filled with acetone for 5 minutes in order to release the remaining photoresist and any residual metal on top of the photoresist. One or more piezoelectric substrates (e.g., the piezoelectric substrate 110 and/or the like), each of which may be 2×2 millimeters in size to 20×10 millimeters in size, may be diced from the crystal lithium niobate ($LiNbO_3$) wafer using, for example, a diamond wafer saw. Residual metal may also be removed from the dicing lines in order to facilitate subsequent separation into individual pieces of piezoelectric substrates. Alternatively and/or additionally, the metals may be deposited on a clean wafer and subsequently patterned using an eximer laser.

In some example embodiments, when the material 160 is deposited onto the surface of the piezoelectric substrate 110, the material 160 may collect at least partially within each of the one or more wetting regions. Moreover, the material 160 collected within each of the one or more wetting regions may have a meniscus, which may refer to a curved surface of a liquid disposed inside a region. To further illustrate, FIG. 1 shows the material 160 collected inside the wetting region 170 as forming the meniscus 170. Although the meniscus 180 is shown as concave, it should be appreciated that the meniscus 180 may be either concave or convex.

As noted, the piezoelectric substrate 110 may be coupled to the power supply 150 via the one or more electrodes 120. Accordingly, the one or more electrodes 120 may transmit an electric signal from the power supply 150 to the piezoelectric substrate 110. Meanwhile, the piezoelectric material 110 may respond to the electric signal by at least converting electric energy from the electric signal into mechanical energy in the form of acoustic waves. For example, the piezoelectric material 110 may convert the electric energy from the electric signal into surface acoustic waves, Bluestein-Gulayev waves, Lamb waves, Love waves, flexural waves, thickness mode vibrations, mixed-mode waves, longitudinal waves, shear mode vibrations, bulk wave vibrations, and/or the like. The acoustic waves may atomize the material 160 collected in the plurality of wetting regions patterned on the surface of the piezoelectric substrate 110. For example, the acoustic waves may atomize the material 160 collected in the wetting region 170 by at least destabilizing the meniscus 180 to form capillary waves that then break up to form aerosol droplets of the material 160. A fine mist of the material 160 may be formed when aerosol droplets of the material 160 are ejected from the meniscus 180.

In some example embodiments, the piezoelectric substrate 110 may be configured to generate acoustic waves having different frequencies in order to control and/or vary the size of the aerosol droplets produced by the acoustic waves. For example, the piezoelectric substrate 110 may be configured to generate acoustic waves having a first frequency at a same time as acoustic waves having a second frequency. Alternatively and/or additionally, the piezoelectric substrate 110 may be configured to generate acoustic waves having the first frequency and the acoustic waves having the second frequency with spatial and/or temporal separation. For instance, the acoustic waves having the first frequency may be generated at a different time than the acoustic waves having the second frequency. Alternatively and/or additionally, the acoustic waves having the first frequency may be generated by a different region of the piezoelectric substrate 110 than the acoustic waves having the second frequency.

As noted, the piezoelectric substrate 110 may respond to the electric signal by at least converting electric energy from the electric signal into mechanical energy in the form of acoustic waves. The frequency of the acoustic waves generated by the piezoelectric substrate 110 may correspond to a resonant frequency of the piezoelectric substrate 110, which may vary depending on a geometry of the piezoelectric substrate 110 and/or the materials forming the piezoelectric substrate 110.

In some example embodiments, the one or more electrodes 120 may couple with the piezoelectric substrate 110 via one or more contacts. For instance, the one or more electrodes 120 may be coupled with the piezoelectric substrate 110 via pin contacts (e.g., pogo pin contacts and/or the like), which may facilitate replacement of the electrodes 120 and/or the piezoelectric substrate 110. Pin contacts may further optimize performance of the acoustic wave atomizer 100, for example, by minimizing mechanical contact between the one or more electrodes 120 and the corresponding electrical contact mechanism. Furthermore, the one or more electrodes 120 may include a combination of different types of electrodes including, for example, planar electrodes, interdigital electrodes, and/or the like. According to some example embodiments, planar electrodes may be patterned over the piezoelectric substrate 110 such that a portion of the surface of the piezoelectric substrate 110 is exposed to encourage the deposit of only a thin film of the material 160 at a location of atomization.

In some example embodiments, variations in the types of electrodes coupled with the piezoelectric substrate 110 may alter the types of acoustic waves generated by the piezoelectric substrate 110. For example, by coupling the piezoelectric substrate 110 with different types of electrodes, the piezoelectric substrate 110 may produce a combination of different types of acoustic waves including, for example, surface acoustic waves, Bluestein-Gulayev waves, Lamb waves, Love waves, flexural waves, thickness mode vibrations, mixed-mode waves, longitudinal waves, shear mode vibrations, bulk wave vibrations, and/or the like.

As shown in FIG. 1, the meniscus 180 may be formed on the surface of the piezoelectric substrate 100, when the material 160 is deposited on the surface of the piezoelectric substrate 110 via the transfer medium 140 coupling the surface of the piezoelectric substrate 110 to the reservoir 130 holding the material 160. A combination of different types of acoustic waves may facilitate the formation of the meniscus 180, such that the meniscus 180 may be suitable for atomization by the acoustic waves generated by the piezoelectric substrate 110. Alternatively and/or additionally, the combination of different types of acoustic waves may provide feedback on a status of the meniscus 180, for example, to a controller (not shown) coupled with the acoustic wave atomizer 100.

For example, the acoustic wave atomizer 100 may include a controller (not shown) configured to determine, based at least on the acoustic waves that are reflected from and/or transmitted through the meniscus 180, an existence of the meniscus 180. The controller may further control an operation of the acoustic wave atomizer 100 depending on the status of the meniscus 180. For instance, the acoustic wave atomizer 100 may cease operation when the meniscus 180 is nonexistent (e.g., no material 160 left to atomize), when the wetting region 170 is contaminated and/or require cleaning, and/or when a placement and/or a size of the meniscus 180 is incorrect due to user error and/or device malfunction. Feedback on the status of the meniscus 180 may be provided, for example, to the controller, via the direct piezoelectric effect in the one or more electrodes 120 on the piezoelectric substrate 110 to the driver.

Figure 2:
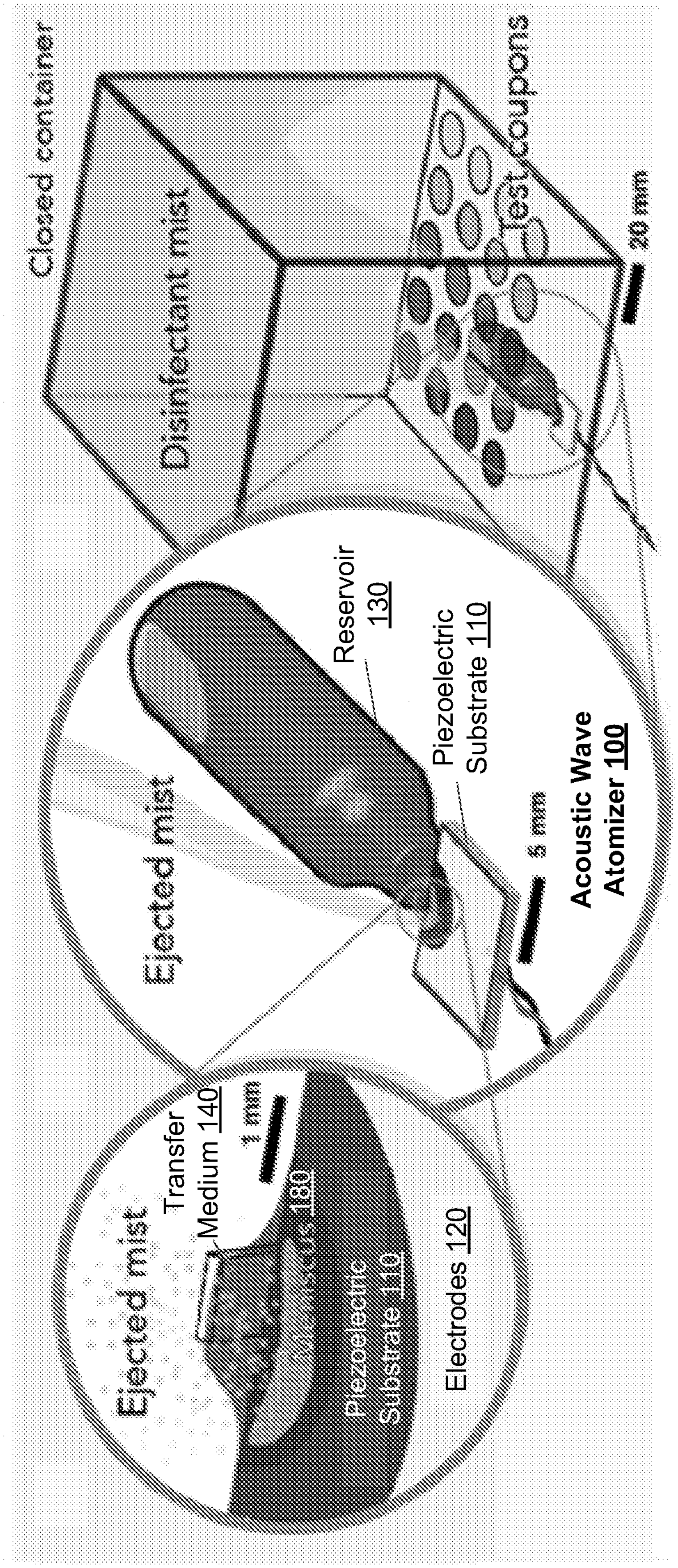
FIG. 2 depicts another perspective of an acoustic wave atomizer, in accordance with some example embodiments.

FIG. 2 depicts another perspective of the acoustic wave atomizer 100, in accordance with some example embodiments. As noted, the acoustic wave atomizer 100 may be used to nebulize the material 160. For example, as shown in FIGS. 1-2, the material 160 may be deposited on the surface of the piezoelectric substrate 110 via the transfer medium 140, which may couple the surface of the piezoelectric substrate 110 to the reservoir 130 holding the material 160. The material 160 deposited on the surface of the piezoelectric substrate 110 may collect in one or more of the wetting regions patterned on the surface of the piezoelectric substrate 110 including, for example, the wetting region 170. Furthermore, the material 160 that is collected in the one or more wetting regions patterned on the surface of the piezoelectric substrate 110 may be atomized by the acoustic waves generated by the piezoelectric substrate 110, for example, when an electric signal is transmitted to the piezoelectric substrate 110 via the one or more electrodes 120. For instance, the acoustic waves may atomize the material 160 collected inside the wetting region 170 by at least destabilizing the meniscus 180 to form capillary waves that break up to form aerosol droplets, which may be ejected at approximately 1 meter per second to form a mist.

As shown in FIG. 2, in some example embodiments, the material 160 may be a disinfectant. Accordingly, the acoustic waves generated by the piezoelectric material 110 may form a mist of the disinfectant, which may be delivered and/or distributed across a surface to at least eliminate bacteria and/or inhibit the growth of bacteria present on the surface. The ability of the acoustic wave atomizer 100 to atomize materials having different viscosities may be observed in the ability of the acoustic wave atomizer 100 to atomize disinfectant liquids having different viscosities. However, it should be appreciated that the acoustic wave atomizer 100 may be used to atomize any material including, for example, fluent materials (e.g., liquids, mixtures, solutions, colloids, suspensions, and/or the like), solid materials, and/or the like. Moreover, the acoustic wave atomizer 100 may be suitable for any application including, for example, drug delivery, 3-dimensional printing, and/or the like. For instance, in some example embodiments, the acoustic wave atomizer 100 may be coupled with a pleural catheter for localized drug delivery including at the millimeter and/or sub-millimeter scale required for the delivery some medications and/or therapeutic compounds (e.g., suspension of cells and/or stem cells, and/or the like).

FIG. 2 shows a technique for evaluating the bactericidal and/or bacteriostatic activities of a disinfectant that is delivered and/or distributed across different surfaces using the acoustic wave atomizer 100. For example, as shown in FIG. 2, the acoustic wave atomizer 100 may be placed inside a closed container along with a plurality of test coupons. In order to evaluate the efficacy of delivering and/or distributing a disinfectant using the acoustic wave atomizer 100, the acoustic wave atomizer 100 may be used to atomize a variety of different disinfectants including disinfectants having varying viscosity such as, for example, 10% bleach, 70% ethanol (EtOH), 25% triethylene glycol (TEG), and/or the like.

It should be appreciated that the ability of the acoustic wave atomizer 100 to atomize liquids having different viscosities and/or densities may be dependent on the rate of energy transfer from the power supply 150. For example, the power input required to atomize a fluid may be dependent on the atomization Reynolds number $R_{eA}$ defined by Equation (1) below. The atomization Reynolds number $R_{eA}$ of a liquid may be a dimensionless quantity in fluid mechanics used to depict a transition from laminar flow to turbulent flow.

$$R_{eA}=\rho u_v L/\mu \qquad (1)$$

wherein ρ, L, μ, and $u_v$ may denote fluid density. It should be appreciated that the flow rate of a liquid may be in direct correlation with its atomization Reynolds number. Furthermore, the power input (e.g., from the power supply 150) required by the acoustic wave atomizer 100 to atomize a liquid may also be in direct correlation with the atomization Reynolds number of the liquid. To further illustrate, Table 1 below depicts the relationship between the atomization Reynolds number, flow rate, and power input associated with liquids of different viscosity. Table 1 shows that higher viscosity liquids (e.g., 25% triethylene glycol (TEG), 50% triethylene glycol (TEG), and/or the like) may have lower atomization Reynolds numbers and maximum flow rate than lower viscosity liquids (e.g., methanol, acetone, and/or the like). As such, the acoustic wave atomizer 100 may require a higher power input to atomize higher viscosity liquids (e.g., 25% triethylene glycol (TEG), 50% triethylene glycol (TEG), and/or the like) than lower viscosity liquids (e.g., methanol, acetone, and/or the like).

TABLE 1

| Fluid | Atomization Reynolds Number ($Re_A$) | Maximum Flow Rate (mL/min) | Power Input (Watts) |
|---|---|---|---|
| Methanol | 7120.00 | 2.40 | 1.04 |
| Acetone | 3818.00 | 1.95 | 0.85 |
| Isopropyl alcohol | 1644.00 | 0.32 | 1.21 |
| Water | 1684.00 | 0.90 | 1.77 |
| 25% Triethylene Glycol | 550.10 | 0.36 | 1.90 |
| 50% Triethylene Glycol | 223.60 | 0.19 | 2.00 |

In some example embodiments, the efficacy of delivering and/or distributing a disinfectant using the acoustic wave atomizer 100 may be further evaluated for different surfaces and/or different bacteria strains. For instance, referring again to FIG. 2, each test coupon may be formed from a different surface material including, for example, polycarbonate, polyethylene terephthalate, stainless steel, borosilicate glass, natural rubber, and/or the like. Furthermore, the surface of each test coupon may be coated with a different bacterial strain such as, for example, methicillin-resistant *Staphylococcus aureus* (MRSA), multidrug-resistant (MDR) strains of Gram-negative bacterial pathogens (e.g., *Klebsiella pneumonia, Escherichia coli, Acinetobacter baumannii*, and/or the like), and/or the like.

Figure 3:
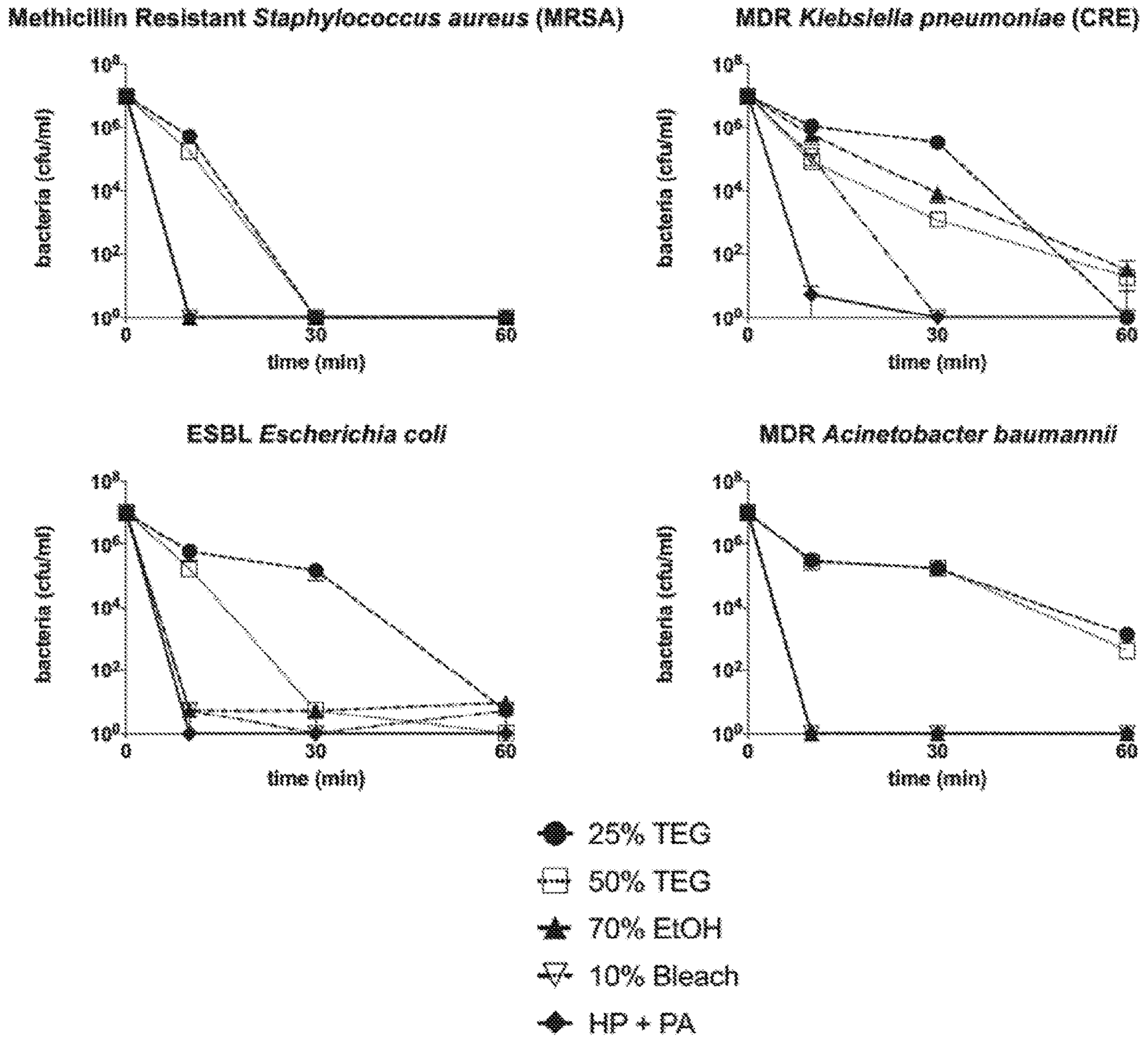
FIG. 3 depicts graphs illustrating a comparison of the bactericidal and/or bacteriostatic activities of different disinfectants delivered via an acoustic wave atomizer, in accordance with some example embodiments.
Figure 4:
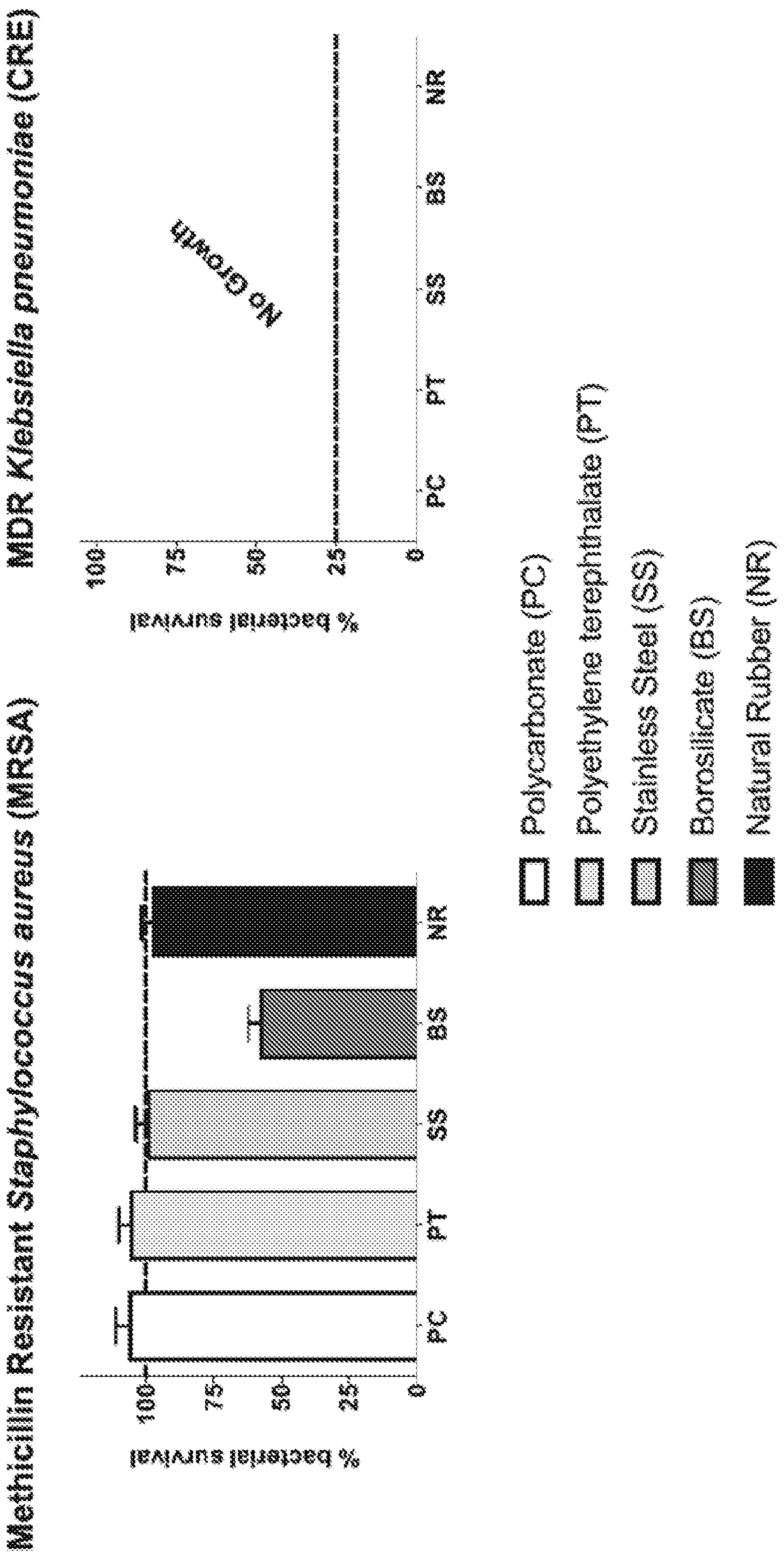
FIG. 4 depicts graphs illustrating a comparison of the bactericidal and/or bacteriostatic activities of a disinfectant delivered via an acoustic wave atomizer on different surface materials, in accordance with some example embodiments.
Figure 5:
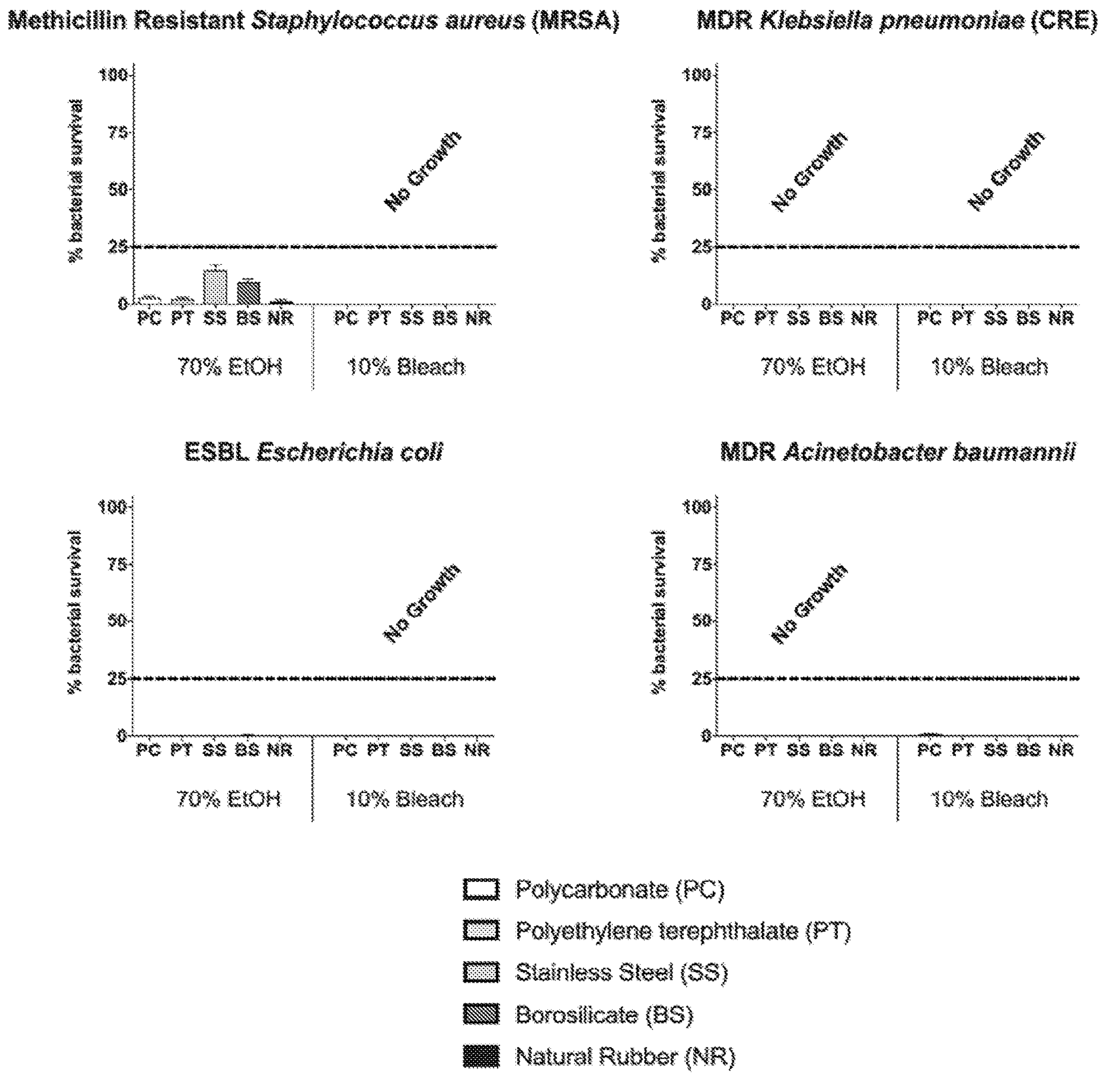
FIG. 5 depicts graphs illustrating a comparison of the bactericidal and/or bacteriostatic activities of different disinfectants delivered via an acoustic wave atomizer on different surface materials, in accordance with some example embodiments.

To further illustrate, FIGS. 3-5 depict a comparison of the bactericidal and/or bacteriostatic activities of different disinfects delivered via the acoustic wave atomizer 100 on different surfaces and/or against different bacterial strains. For example, FIG. 3 depicts time-kill curves illustrating a change in the quantity of different types of bacteria (e.g., *Staphylococcus aureus* (MRSA), *Klebsiella pneumonia, Escherichia coli*, and *Acinetobacter baumannii*) that is present on a surface treated with different disinfectants (e.g., 10% bleach, 70% ethanol (EtOH), 25% triethylene glycol (TEG), 50% triethylene glycol (TEG), and 7.35% hydrogen peroxide plus 0.23% peracetic acid (HP+PA)). Meanwhile, FIGS. 4-5 depict graphs illustrating the percentage of bacterial survival on different contaminated surfaces (e.g., polycarbonate, polyethylene terephthalate, stainless steel, borosilicate glass, and natural rubber) that are treated with different disinfectants delivered and/or distributed via the acoustic wave atomizer 100. In some example embodiments, the acoustic wave atomizer 100 may be capable of effectively atomizing any disinfectant including low viscosity disinfectants and high viscosity disinfectants. For instance, FIGS. 3-5 show contaminated surfaces as being effectively decontaminated by low viscosity disinfectants as well as high viscosity disinfectants delivered and/or distributed by the acoustic wave atomizer 100.

Figure 6:
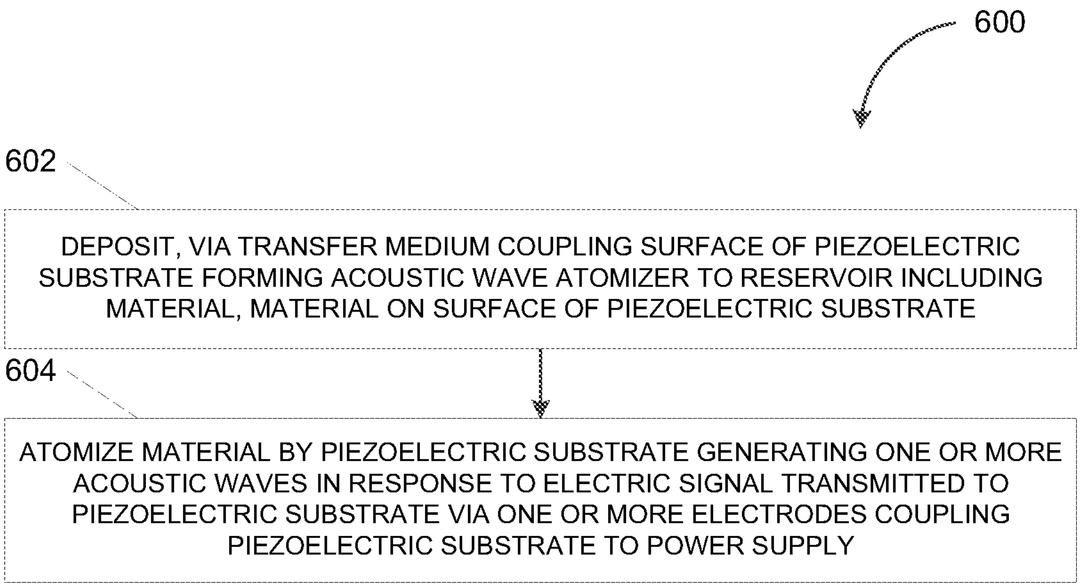
FIG. 6 depicts a flowchart illustrating a process for acoustic wave based atomization, in accordance with some example embodiments.

FIG. 6 depicts a flowchart illustrating a process 600 for acoustic wave based atomization, in accordance with some example embodiments. Referring to FIGS. 1-2 and 6, the process 600 may be performed by the acoustic wave atomizer 100 to deliver and/or distribute, for example, the material 160.

At 602, a material may be deposited on a surface of a piezoelectric substrate forming an acoustic wave atomizer via a transfer medium coupling the surface of the piezoelectric substrate to a reservoir including the material. In some example embodiments, the acoustic wave atomizer 100 may include the piezoelectric substrate 110, which may be formed from a monocrystalline piezoelectric material such as, for example, lithium niobate ($LiNbO_3$), quartz ($SiO_2$), lithium tantalate ($LiTaO_3$), langasite ($La_3Ga_5SiO_{14}$), and/or the like. The surface of the piezoelectric substrate 110 may be coupled, via the transfer medium 140, to the reservoir 130. Accordingly, as shown in FIGS. 1-2, the material 160 from the reservoir 130 may be deposited on the surface of the piezoelectric substrate 110 via the transfer medium 140. Furthermore, the material that is deposited on the surfaced of the piezoelectric substrate 110 may collect in one or more wetting regions patterned on the surface of the piezoelectric substrate 110. For example, FIGS. 1-2 show the material 160 as collecting inside at least the wetting region 170 to form the meniscus 180.

At 604, the piezoelectric substrate may atomize the material by at least generating one or more acoustic waves in response to an electric signal transmitted to the piezoelectric substrate via one or more electrodes coupling the piezoelectric substrate to a power supply. For example, as shown in FIGS. 1-2, the the piezoelectric substrate 110 may be coupled to the power supply 150 via one or more electrodes 120. As such, the one or more electrodes 120 may transmit an electric signal from the power supply 150 to the piezoelectric substrate 110. Meanwhile, the piezoelectric substrate 110 may respond to the electric signal by at least converting electric energy in the electric signal into mechanical energy in the form of acoustic waves including, for example, Bluestein-Gulayev waves, Lamb waves, Love waves, flexural waves, thickness mode vibrations, mixed-mode waves, longitudinal waves, shear mode vibrations, bulk wave vibrations, and/or the like. The acoustic waves may atomize the material 160 collected in the wetting region 170 by at least destabilizing the meniscus 180 to form capillary waves that then break up to form aerosol droplets of the material 160. A fine first of the material 160 may be formed when aerosol droplets of the material 160 are ejected from the meniscus 180.

In some example embodiments, the piezoelectric substrate 110 may generate acoustic waves having different frequencies in order to control and/or vary the size of the aerosol droplets produced by the acoustic waves. The frequency of the acoustic waves generated by the piezoelectric substrate 110 may correspond to a resonant frequency of the piezoelectric substrate 110. As noted, the resonant frequency of the piezoelectric substrate 110 may vary depending on a geometry of the piezoelectric substrate 110 and/or the materials forming the piezoelectric substrate 110. Thus, the piezoelectric substrate 110 may be configured to generate acoustic waves having a first frequency at a same time and/or a different time as acoustic waves having a second frequency. Alternatively and/or additionally, one region of the piezoelectric substrate 110 may be configured to generate acoustic waves having the first frequency while another region of the piezoelectric substrate 110 may be configured to generate acoustic waves having the second frequency. One or more regions of the piezoelectric substrate 110 may also be configured to generate different types of acoustic waves than other regions of the piezoelectric substrate 110.

In some example embodiments, the one or more electrodes 120 coupled with the piezoelectric material 110 may include a combination of different types of electrodes including, for example, planar electrodes, interdigital electrodes, and/or the like. As noted, varying the types of electrodes coupled with the piezoelectric substrate 110 may alter the types of acoustic waves generated by the piezoelectric substrate 110. For example, by coupling the piezoelectric substrate 110 with different types of electrodes, the piezoelectric substrate 110 may produce a combination of different types of acoustic waves including, for example, surface acoustic waves, Bluestein-Gulayev waves, Lamb waves, Love waves, flexural waves, thickness mode vibrations, mixed-mode waves, longitudinal waves, shear mode vibrations, bulk wave vibrations, and/or the like.

Figure 7:
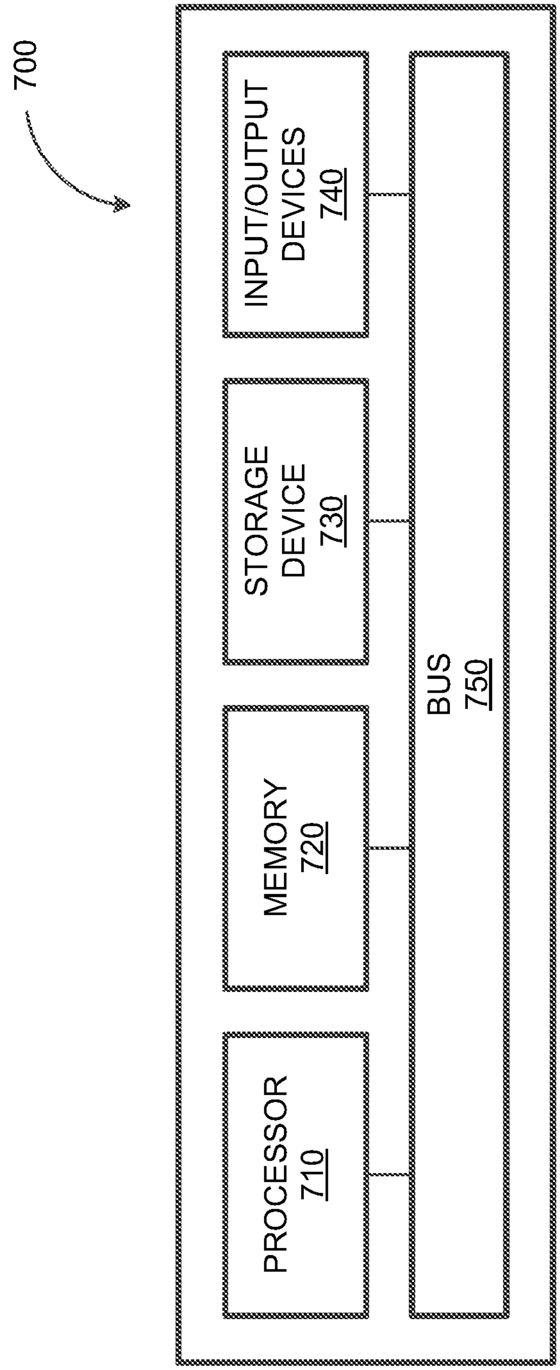
FIG. 7 depicts a block diagram illustrating a computing system, in accordance with some example embodiments.

FIG. 7 depicts a block diagram illustrating a computing system 700 consistent with implementations of the current subject matter. Referring to FIGS. 1-2 and 7, the computing system 700 can be used to implement a controller coupled with the acoustic wave atomizer 100 and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the controller coupled with the acoustic wave atomizer 100. In some example embodiments, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, a tape device, a solid state device, and/or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some example embodiments, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some example embodiments, the computing system 700 can be used to execute any type of software applications. These applications can be used to perform various functionalities including add-in functionalities standalone functionalities, and/or the like. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus, comprising:

a monocrystalline piezoelectric substrate comprising an atomizing surface and a non-atomizing surface, the atomizing surface having a surface patterned with at least one wetting region comprising a plurality of wells, each well having an indented semicircular cross section, a first region of the monocrystalline piezoelectric substrate configured to respond to an electric signal by at least generating a first plurality of acoustic waves associated with a first frequency, a second region of the monocrystalline piezoelectric substrate configured to respond to the electric signal by at least generating a second plurality of acoustic waves associated with a second frequency, and the first and second plurality of acoustic waves atomizing at least a portion of a material discharged on the atomizing surface and collected on a surface of the at least one wetting region, and wherein the non-atomizing surface comprises one or more electrodes coupled to the monocrystalline piezoelectric substrate.

2. The apparatus of claim 1, wherein the first plurality of acoustic waves comprise and/or the second plurality of acoustic waves comprise surface acoustic waves, Bluestein-Gulayev waves, Lamb waves, Love waves, flexural waves, thickness mode vibrations, mixed-mode waves, longitudinal waves, shear mode vibrations, and/or bulk wave vibrations.

3. The apparatus of claim 1, wherein the monocrystalline piezoelectric substrate generates the first plurality of acoustic waves associated with the first frequency at a same time or at a different time as the second plurality of acoustic waves associated with the second frequency.

4. The apparatus of claim 1, wherein generation of the first plurality of acoustic waves associated with the first frequency and the second plurality of acoustic waves associated with the second frequency controls and/or varies a droplet size and/or a droplet size distribution of the material being atomized.

5. The apparatus of claim 1, wherein the monocrystalline piezoelectric substrate generates the first plurality of acoustic waves associated with the first frequency when the monocrystalline piezoelectric substrate is associated with a first resonant frequency, wherein the monocrystalline piezoelectric substrate generates the second plurality of acoustic waves associated with the second frequency when the monocrystalline piezoelectric substrate is associated with a second resonant frequency, and wherein the first resonant frequency and/or the second resonant frequency correspond to a geometry of the monocrystalline piezoelectric substrate and/or a material forming the monocrystalline piezoelectric substrate.

6. The apparatus of claim 1, wherein the one or more electrodes couple the monocrystalline piezoelectric substrate to a power supply.

7. The apparatus of claim 6, wherein the one or more electrodes include a planar electrode that is patterned over to reveal a portion of the surface of the monocrystalline piezoelectric substrate in order to encourage a deposit of a thin film of the material at a location of atomization.

8. The apparatus of claim 6, wherein the one or more electrodes includes a combination of different types of electrodes such that the first plurality of acoustic waves includes a combination of different types of acoustic waves, and wherein the combination of different types of electrodes includes at least one of a planar electrode and an interdigital electrode.

9. The apparatus of claim 6, wherein a power input associated with the power supply is determined based at least on a viscosity of the material.

10. The apparatus of claim 1, further comprising:

a transfer medium coupling the surface of the monocrystalline piezoelectric substrate to a reservoir including the material, the material being transferred, via the transfer medium, from the reservoir to the surface of the monocrystalline piezoelectric substrate.

11. The apparatus of claim 10, wherein a point of contact between the transfer medium and the monocrystalline piezoelectric substrate is positioned towards an edge of the monocrystalline piezoelectric substrate in order to prevent at least a portion of the first plurality of acoustic waves from being absorbed by the transfer medium and/or the reservoir.

12. The apparatus of claim 10, wherein a tip and/or a stiffness of the transfer medium is configured to prevent at least a portion of the first and second plurality of acoustic waves from being absorbed by the transfer medium and/or the reservoir.

13. The apparatus of claim 1, wherein a hydrophilic material, a hydrophobic material, a superhydrophilic material, a superhydrophobic material, an oleophobic material, and/or an oleophilic material is deposited on the surface of the monocrystalline piezoelectric substrate, and wherein the hydrophilic material, the hydrophobic material, the superhydrophilic material, the superhydrophobic material, the oleophobic material, and/or the oleophilic material is patterned to encourage a deposit of a thin film of the material at a location of atomization.

14. The apparatus of claim 1, wherein the material collected within the at least one wetting region forms a meniscus, wherein the first and second plurality of acoustic waves atomizes at least the portion of the material by at least destabilizing the meniscus to form capillary waves, and wherein the capillary waves break up to form a plurality of aerosol droplets of the material.

15. The apparatus of claim 14, wherein a mist of the material is formed by the plurality of aerosol droplets of the material being ejected from the meniscus.

16. The apparatus of claim 14, wherein the apparatus is further configured to determine, based at least on a feedback associated with the first plurality of acoustic waves, a status of the meniscus, and wherein the apparatus is configured to cease operation when the status of the meniscus indicates that the meniscus is nonexistent, the meniscus is placed incorrectly, the meniscus is sized incorrectly, and/or the wetting region is contaminated.

17. The apparatus of claim 16, wherein the feedback corresponds to a reflection and/or a transmission of the first plurality of acoustic waves.

18. The apparatus of claim 1, wherein the at least one wetting region comprises a channel.

19. The apparatus of claim 1, wherein a cross section of the at least one wetting region is semicircular, rectangular, and/or triangular in shape.

* * * * *